United States Patent
Qi et al.

(10) Patent No.: US 8,973,020 B2
(45) Date of Patent: Mar. 3, 2015

(54) GENERATING A WEB SERVICE

(75) Inventors: Yao Qi, Beijing (CN); Xing Xing Shen, Beijing (CN); Chuang Tang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 13/114,237

(22) Filed: May 24, 2011

(65) Prior Publication Data

US 2011/0296442 A1  Dec. 1, 2011

(30) Foreign Application Priority Data

May 31, 2010 (CN) .......................... 2010 1 0188585

(51) Int. Cl.
  G06F 3/00 (2006.01)
  G06F 9/44 (2006.01)
(52) U.S. Cl.
  CPC ....................................... G06F 8/74 (2013.01)
  USPC ........................................................ 719/328
(58) Field of Classification Search
  None
  See application file for complete search history.

(56) References Cited

U.S. PATENT DOCUMENTS

| | | | |
|---|---|---|---|
| 7,590,661 B2 | 9/2009 | Regnier | |
| 7,590,988 B2 | 9/2009 | Milligan et al. | |
| 7,593,994 B2 | 9/2009 | Milligan et al. | |
| 2004/0044656 A1* | 3/2004 | Cheenath | 707/3 |
| 2007/0038896 A1 | 2/2007 | Champlin et al. | |
| 2007/0283338 A1* | 12/2007 | Gupta et al. | 717/154 |
| 2008/0301682 A1* | 12/2008 | Newport et al. | 718/101 |
| 2010/0005455 A1* | 1/2010 | Gyure et al. | 717/128 |
| 2010/0017789 A1* | 1/2010 | DeWitt et al. | 717/126 |
| 2010/0050257 A1 | 2/2010 | Jin | |
| 2010/0064179 A1* | 3/2010 | Champlin et al. | 714/38 |

FOREIGN PATENT DOCUMENTS

CN  101582048 A  11/2009

OTHER PUBLICATIONS

Chinese Office dated Apr. 17, 2013 for Chinese Patent Application No. 201010188585.6, Yao Qi et al., filed May 31, 2010, see in particular p. 7.

* cited by examiner

Primary Examiner — H S Sough
Assistant Examiner — Carina Yun
(74) Attorney, Agent, or Firm — Thomas E. Lees, LLC

(57) ABSTRACT

Web services are automatically generated from corresponding Web applications under service-oriented architecture. A Web service is generated based on a Web application, comprising: obtaining user input information of the Web application, obtaining call stack information that is generated by the Web application at runtime based on the user input information, performing parameter matching between the user input information and the call stack information, selecting a method from the call stack information as an application programming interface based on a result of the parameter matching and the call stack information, and generating the Web service using the application programming interface.

24 Claims, 5 Drawing Sheets

GENERATING A WEB SERVICE

CROSS-REFERENCE TO RELATED APPLICATIONS

This application claims priority to Chinese Patent Application No, 201010188585.6, filed May 31, 2010, the disclosure of which is incorporated herein by reference.

BACKGROUND

Various aspects of the present invention relate generally to Web service technology, and more specifically, to the technology of automatically generating a Web service from a Web application under a service-oriented architecture.

The rapid development of service-oriented architecture principles is placing an increasing demand on Web services to function as a standards-based way to realize service oriented architecture implementations. A web service is a kind of service-oriented architecture technology that provides services via standard network protocols for the purpose of ensuring interoperation among application services on different platforms. In brief, a Web service is essentially an application programming interface (API) that can be called via a network, by means of programming. In other words, after a Web service is generated, the Web service is used by a Web application rather than being directly used by an end user. A Web application that calls the Web service is referred to as a client.

Considering in particular, the field of enterprise applications, with the growth of an enterprise, there might be many separate applications that were developed and deployed previously. These Web applications are also referred to as "legacy systems." These separate "legacy systems" are not interrelated and thus may be understood as Web applications that are separate from each other. Such legacy systems provide clients of a corresponding enterprise or the enterprise itself, with services such as a human resource management system, an order system, or a supply chain management system, etc. All of these separate legacy systems may have been developed by different software service providers at different times. As client demands grow continuously, these existing "legacy systems" may no longer meet the demands of current markets.

BRIEF SUMMARY

According to aspects of the present invention, a Web service is generated based on a Web application by obtaining user input information of the Web application, obtaining call stack information that is generated by the Web application at runtime based on the user input information, and performing parameter matching between the user input information and the call stack information. The Web service is further generated by selecting a method from the call stack information as an application programming interface, based on a result of the parameter matching and the call stack information. The application programming interface is utilized to generate the Web service.

BRIEF DESCRIPTION OF THE SEVERAL VIEWS OF THE DRAWINGS

The above and other features of the present invention will become more apparent from the detailed description of embodiments, when taken in conjunction with the figures wherein like numerals denote the same or like components. In the figures.

FIG. 3A illustrates a user input information interface for the function "Create New Users" of a Web application;

FIG. 3B illustrates call stack information for the function "Create New Users" based on eight input values from the user;

FIG. 3C illustrates a general procedure of parameter matching;

FIG. 3D illustrates a Web service generated by using the selected, method as an API of a function of the Web application "Create New Users"

DETAILED DESCRIPTION

According to aspects of the present invention, a Web service is generated based upon an existing Web application by identifying a suitable API of the Web application without obtaining the source code of the Web application. According to further aspects of the present invention, Web service generation is provided, to automatically identify an API of a Web application without manually reading a large amount of source code of the Web application, thereby saving manpower and time.

Still farther aspects of the present invention automatically identify a suitable API by a tactful use of call stack information, thereby avoiding tremendous labor and effort required to manually read source code to seek an API for a Web application or a function of a Web application. Thus, the time typically required for generating a Web service is reduced. Moreover, the efficiency of generating a Web service based on a "legacy system" is improved, thereby saving the cost for developing a new system. Further, according to certain aspects of the present invention, the source code of the "legacy system" (Web application) need not be obtained during the process of Web service generation.

Figure 1:
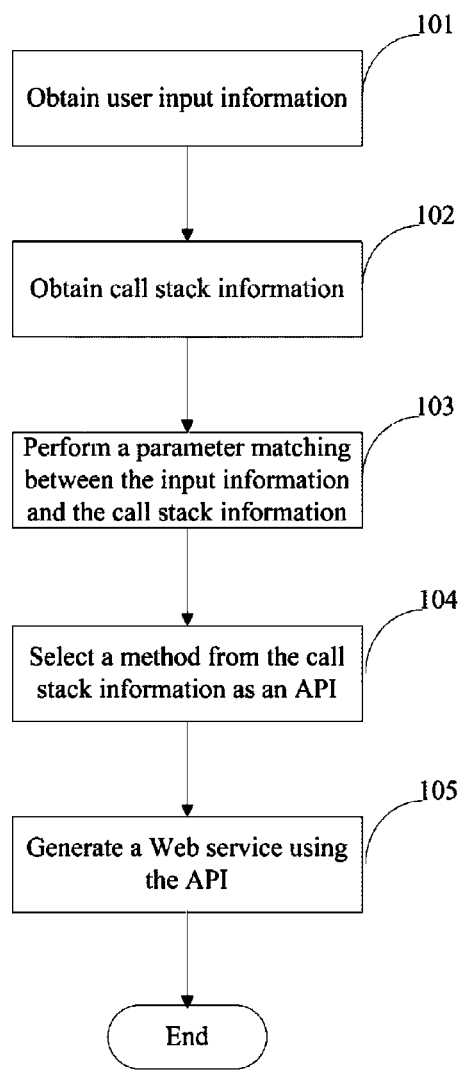
FIG. 1 illustrates a flowchart of a method of generating a Web service according to an embodiment of the present invention.

FIG. 1 illustrates a flowchart of a method of generating a Web service based on a Web application according to an embodiment of the present invention. According to an illustrative example, a Web application is an existing "legacy system" that has been deployed on a Web application server.

The method illustrated in FIG. 1 starts at 101 by obtaining user input information of the Web application. According to an embodiment of the present invention, user input information of a Web application comprises relevant parameter information that is inputted into a user interface of a certain Web application by a user of this Web application during use of the Web application. According to another embodiment of the present invention, user input information of a Web application comprises relevant parameter information that is inputted into a user interface, which is provided by a certain particular function of a certain Web application, by a user of the Web application during use of this particular function. For example, in a user logon interface of an exemplary Web application such as "Air Tickets Booking," parameter values inputted by a user, such as account name, password, place of departure, place of destination, and airline, are considered user input information of this Web application.

Generating a Web service based on a Web application means either generating a Web service API for a Web application, or generating a Web service API for a function of a Web application. Therefore, exemplary implementations can simultaneously generate multiple Web services APIs for the same Web application when this Web application contains multiple functions. Also, the "user" involved in "user input information" may be an actual user of a Web application or the user may be a software developer of a Web service that is generated for the development of a new system.

Referring back to the flowchart at 101, various specific approaches may exist to obtain the user input information of a Web application. According to an embodiment of the present invention, user input information comprises intercepted background values entered by the user when the user is inputting relevant parameter information. According to another embodiment of the present invention, specific content of user input information is determined by recording a keyboard input operation of the user.

The flow then proceeds to 102 where call stack information is obtained. The obtained call stack information is generated by the Web application at runtime based on the user input information. A call stack is information that represents a call relationship among methods (functions) at runtime of a program. Call stack information is usually used for checking the coverage ratio of a test routine, i.e., the coverage degree of the test routine with respect to respective functions of a tested program for evaluating the performance of the test routine.

According to an embodiment of the present invention, however, such call stack information is used to identify a certain method (function) of a Web application as a Web service API, as will be described in greater detail herein. Various manners or tools may be used for obtaining call stack information of the Web application and thus, such manners and tools will not be detailed here.

The flow then proceeds to 103 where parameter matching is performed between the user input information and the call stack information. The purpose of parameter matching is to identify from the call stack information, a suitable method (function) as a Web service API. The call stack information contains the entire information regarding classes of the Web application at runtime and the methods (functions) that are called by the respective classes, and it further contains the information regarding parameter names of the respective methods (functions), inputted parameter values on which the actual running process is based, and the value types.

Since the call stack information contains the information regarding inputted parameter values and value types, the parameter matching may be done by comparing the parameter value information in the user input information as obtained at 101 with the parameter value information of methods in the call stack information as obtained at 102. According to an embodiment of the present invention, parameter matching means the matching of parameter values. That is, the input value for a particular input field in the user input information is compared with the parameter values of methods in the call stack information, so as to determine whether there is a method in the call stack information whose parameter value is equal to the input value.

The user input information of a Web application may be related to a plurality of input fields. For example, in the Web application "Air Tickets Booking," a user needs to enter inputs to a plurality of input fields such as account name, password, place of departure, place of destination, airline, etc. According to an embodiment of the present invention, a lookup is required for each input value in the user input information. According to another embodiment of the present invention, a lookup may not be required for each input value but for a certain percentage of input values in the call stack information (e.g., 80% of input values). According to a further embodiment of the present invention, in addition to the parameter value matching, the parameter matching comprises parameter type matching, e.g. "character stings," "floating points," etc.

Next, at 104, a method is selected from the call stack information as an application programming interface API based on the result of parameter matching and the call stack information. As introduced above, a difficulty in implementing a method of generating a Web service based on a Web application (or a function of a Web application) lies in how to select an application programming interface API for a Web application (or a function of a Web application). In essence, a Web application may be considered as an exposed API. Since the parameter matching of the user input information and the call stack information has been performed at 103, the parameter values of some methods successfully match an input value of a certain input field in the user input information.

However, the API for generating a Web service should be a single API, in order to ensure that a Web application or a function of a Web application may be called by such an API. Hence, it is necessary to select a suitable method from the call stack information as an API, based on the result of the matching at 103 and the call stack information, such that it is possible to call a Web application or a certain function of a Web application via the selected. API. Selecting a method from the call stack information may be implemented in various embodiments, which will be described in detail with reference to FIG. 2.

Since a method is selected from the call stack information as an API for generating a Web service at 104, a Web service may be generated with such an API by using customary technical approaches at 105. According to an embodiment of the present invention, before generating a Web service with the API, the API may be wrapped as appropriate. According to another embodiment of the present invention, an XML description file is generated for a Web service by using WSDL language (Web service description language). With an API for generating a Web service obtained, a method of generating the Web service is not detailed here.

Embodiments of the present invention are utilizable to automatically identify a suitable API by a tactful use of the call stack information, thereby avoiding tremendous labor and efforts of manually reading source code to seek an API for a Web application or a function of a Web application. Time for generating a Web service is thus saved. Moreover, the efficiency of generating a Web service based on a "legacy system" is improved, thereby saving the cost for developing a new system. Further, there is no need to obtain the source code of the "legacy system" (Web application) during the process of Web service generation.

Figure 2:
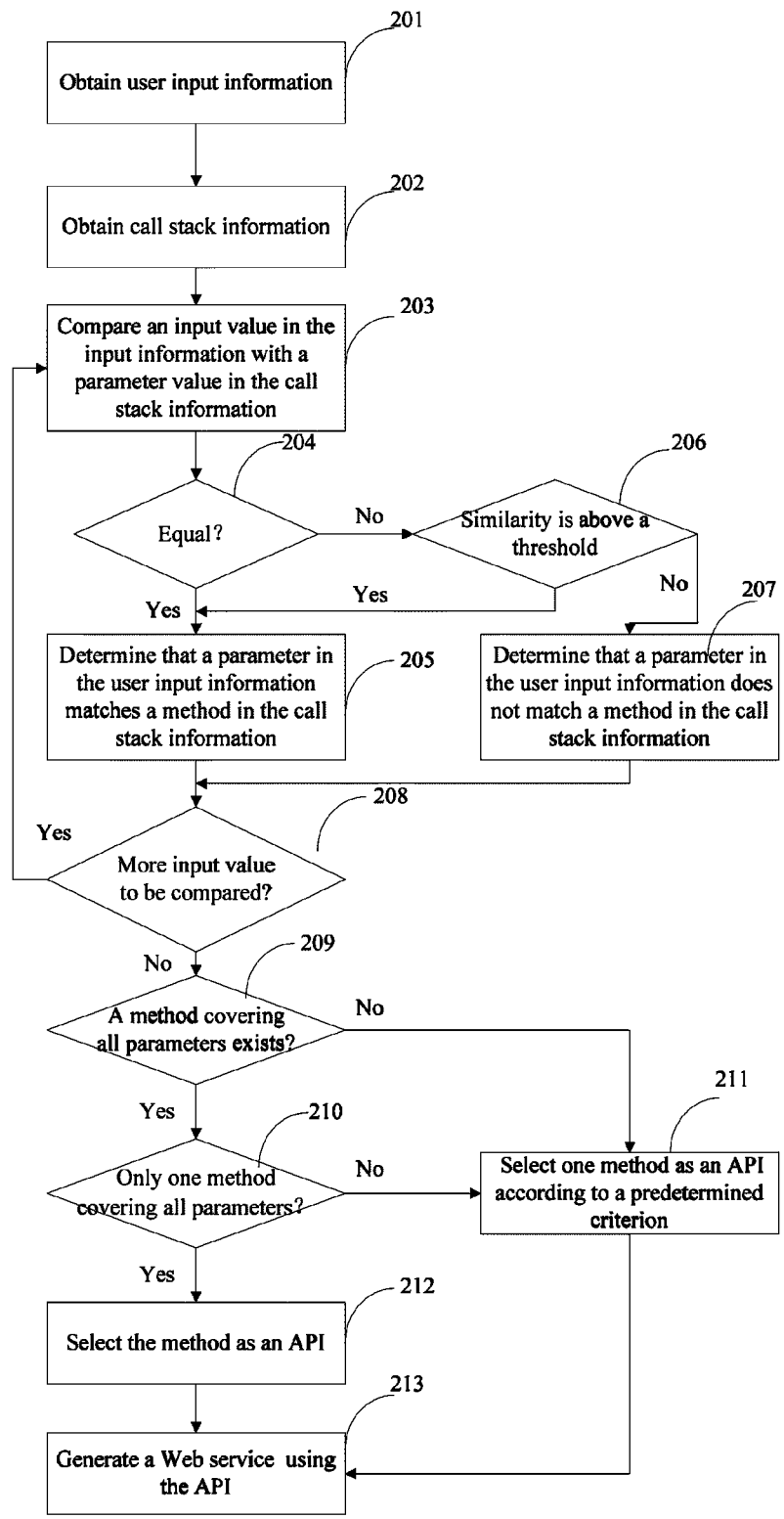
FIG. 2 illustrates a flowchart of a method of generating a Web service according to another embodiment of the present invention.

FIG. 2 illustrates a flowchart of a method of generating a Web service according to another embodiment of the present invention. Obtaining user input at 201 and obtaining call stack information at 202 correspond to obtaining user input at 101 and obtaining call stack information at 102 of the method as illustrated in FIG. 1, respectively, and thus are not detailed here. Further, performing parameter matching at 103 of the method in FIG. 1 may be understood as being decomposed into flows at 203-208 in FIG. 2.

According to an embodiment of the present invention, at 203, an input value for a particular input field in the user input information is compared with a parameter value of a method in the call stack information, and at 204, a decision is made as to whether these two values are equal, whether the input value is equal to the parameter value. If the two values are equal to each other, a determination is made at 205 whether the parameter in the user input information corresponding to the input value matches the method in the call stack information.

For example, in the user input information, if the input value for an input field "account name" in the Web application "Air Tickets Booking" is "mike," then at 203 the value "mike" is compared with the parameter values of methods in the call stack information to look up whether a method whose parameter value is "mike" exists in the call stack information. If such a method is found in the call stack information, it is then determined that this method matches the parameter (or referred to as an input field) "account name" in the user input information corresponding to the user input value "mike."

Since the call stack information might comprise a plurality of methods, according to an embodiment of the present invention, for an input value in the user input information, it is necessary to compare this input value with the parameter values of the plurality of methods in the call stack information to determine whether the call stack information includes a method that matches the parameter (input field) of the user input information corresponding to the user input value.

If the result of decision is NO at 204, a decision is made at 206, as to whether a similarity between the two values is greater than a threshold. According to an embodiment of the present invention, the "threshold" herein is a preset similarity threshold, e.g., 80%. According to another embodiment of the present invention, the negative result of a decision at 204 means that no parameter value of all methods in the call stack information is equal to an input value for a particular input field in the user input information. In this case, the similarity therebetween is decided in order to determine from the call stack information, a method that matches the parameter in the user input information corresponding to the input value.

If the result of decision is YES at 206, i.e., the similarity between the two values is greater than the threshold, then the flow proceeds to 205 where a determination is made as to whether the parameter of the user input information corresponding to the input value matches the method in the call stack information. If none of similarities between the input value and parameter values of methods in the call stack information are greater than the threshold, i.e., the result of decision is NO at 206, then a determination is made at 207 that the parameter in the user input information corresponding to the input value does not match a method in the call stack information.

At 208, a determination is made as to whether there is an input value in the user input information that has not been subjected to comparison. The reason for decision at 208 is that the user input information might contain a plurality of input fields. If the result of decision at 208 is YES, then the flows at 203-208 are repeated. If the result of decision at 208 is NO, i.e., all input values for different input fields (parameters) in the user call information have been subjected to the operation of parameter matching, the flow then proceeds to 209.

The flows at 209-212 may be understood as refinements to the flow at 104 of the method in FIG. 1. A purpose of the flows at 209-212 is to select a method from the call stack information as an API. At 209, a decision is made as to whether the call stack information includes a method that covers all input fields (parameters) comprised in the user input information. A reason for the decision at 209 is that the call stack information might comprise a plurality of classes each comprising multiple methods, while some of the methods might be determined in a previous step to be matching a parameter corresponding to a certain input value.

However, it is necessary to find a method that covers, via a class referenced by this method, a plurality of methods that are comprised under the referenced class, thereby covering multiple or all of the parameters to which the plurality of methods are determined to be matching. In this way, the Web application or a function of the Web application may be called by selecting only one method as the API. For example, if an input value for the input field "account name" in the Web application "Air Tickets Booking" is "mike," and an input value for the input field "password" is "1234," and if a method A whose parameter value is "mike" and a method B whose parameter value is "1234" are found in the call stack information, then a determination is made according to the previous flow that method A matches the parameter "account name" and method B matches the parameter "password."

However, it is further decided at 209 whether the call stack information includes a method that covers both the parameter "account name" and the parameter "password." Supposing that both methods A and B belong to methods under a class UserVO in the call stack information, and under class UserDO there exists a method. C that calls UserVO. For example, method C is expressed as C(UserVO) in the call stack information. Then it is determined that method C is a method that covers all parameters. Method C covers methods A and B under class UserVO by calling class UserVO and thus covers both the parameters "account name" and "password."

If the result of decision at 209 is YES, then at 210, a further decision is made as to whether there is only one method that covers all parameters. Still referring to the above example, it is assumed that in addition to method C that covers all parameters, another method D that covers all parameters also exist under another class UserPO. In this case, in order to select only one method as an API, it is necessary to select, at 211, one method to be the API from a plurality of methods each of which covers all parameters according to a predetermined criterion. Various kinds of predetermined criteria might exist.

According to an embodiment of the present invention, the predetermined criterion is that among the plurality of methods each of which covers all parameters, a method that is relatively located at the bottom layer of the call stack information is selected as an API. Being located at the bottom layer of the call stack information means that this method does not call another class or calls relatively the fewest classes.

According to another embodiment of the present invention, the predetermined criterion is to select, from methods each of which covers all parameters, a method that is located at the top layer of the call stack information as an API. Being located at the top layer of the call stack information means that this method calls the most classes or is not called by another class.

According to another embodiment of the present invention, the predetermined criterion is to provide the plurality of methods each of which covers all parameters in the user input information as candidate methods. In other words, rather than selecting only one method automatically, both methods C and D in the above example are outputted as candidate methods, and one of them is finally selected as an API by developers according to predetermined circumstances. The foregoing embodiments of the predetermined criterion are merely for an illustrative purpose, and other criteria may be selected based on actual system running environments. Other criteria may be selected within the scope of the present invention.

If the result of decision at 210 is YES, then the flow proceeds to 212 where the only method that covers all parameters is selected as an API. Next, at 213, a Web service is generated by using the selected API. The flow at 213 corresponds to the flow at 105 in FIG. 1 and is not detailed here. Likewise, after a method is selected at 211 from the plurality of methods each of which covers all parameters as an API, the flow proceeds to 213 where a Web service is generated by using the selected API.

Referring back to the flow at 209, the operations when the result of decision at 209 is YES have been described above. Now the operations when the result of decision at 209 is NO will be described below. If the result of decision at 209 is NO, the flow then proceeds to 211 where a method is selected as an API based on a predetermined criterion. Although the flow at 211 is performed just as the case that the result of decision at 210 is NO, the predetermined criterion is different at this point.

When the result of decision at 209 is NO, the flow at 211 is performed in order to select a method as an API from the plurality of methods none of which covers all parameters. According to an embodiment of the present invention, the predetermined criterion at this point is to select from the call stack information a method having the highest coverage ratio as an API. The highest coverage ratio means, for example, that if method C covers 2 parameters, method D covers 3 parameters, and if the user input information comprises a total of 5 parameters, then method D has the highest coverage ratio (60%), though neither of methods C and D covers all parameters.

According to another embodiment of the present invention, the predetermined criterion means outputting all methods, each of which partially covers parameters in the user input information based on the coverage ratios in a high-to-low order as candidate methods, such that one method is finally selected as an API by developers based on predetermined circumstances. In other words, methods C and D are outputted in an order that method C follows method D, such that a developer may select one of them as an API.

According to another embodiment of the present invention, the predetermined criterion means that the coverage ratio is above a predetermined threshold (e.g., 95%). The foregoing embodiments of the predetermined criterion are merely for an illustrative purpose, and other criterion may be selected based on actual system running environments. No matter what kinds of criteria are selected, they fall within the scope of the present invention.

If the result of a decision at 209 is YES, i.e., the call stack information includes a method that covers all parameters, it is unnecessary to make decisions with respect to other methods in the call stack information. Instead, once a method covering all parameters is detected, it is selected as an API. In this case, the flow at 212 is performed directly without carrying out the flows at 210 and 211.

There is a relatively low probability that the result of decision at 209 is NO, since the call stack information should comprise at least one method that covers all parameters in general. In embodiments of the present invention, the reason Why a negative result of the decision is taken into consideration lies in the observation that in some Web applications that are poorly programmed, it is possible that no such a method that covers all parameters exists.

Further, the decision at 204 also rarely results in NO. Generally speaking, a user input value will be reflected as an equal parameter value among parameters of a certain method in the call stack information. In embodiments of the present invention, a negative result of decision at 204 is considered for the following reasons. In some cases where, for example, a Web application requires an input value to be an integer value (automatically rounding a decimal part), if a user input value is "35.6," for example, then a parameter value of a method in the call stack information is "36," but the value for the user input information as obtained at 201 might still be "35.6". In this event, a similarity decision is introduced at 206 in order to avoid missing a method that should be matching during the parameter value matching. However, neither of the decision flows at 204 and 209 of the method as illustrated in FIG. 2 is an essential step.

FIGS. 3A-3D illustrate an example of generating a Web service based on a function of a Web application according to an embodiment of the present invention.

Figure 3A:
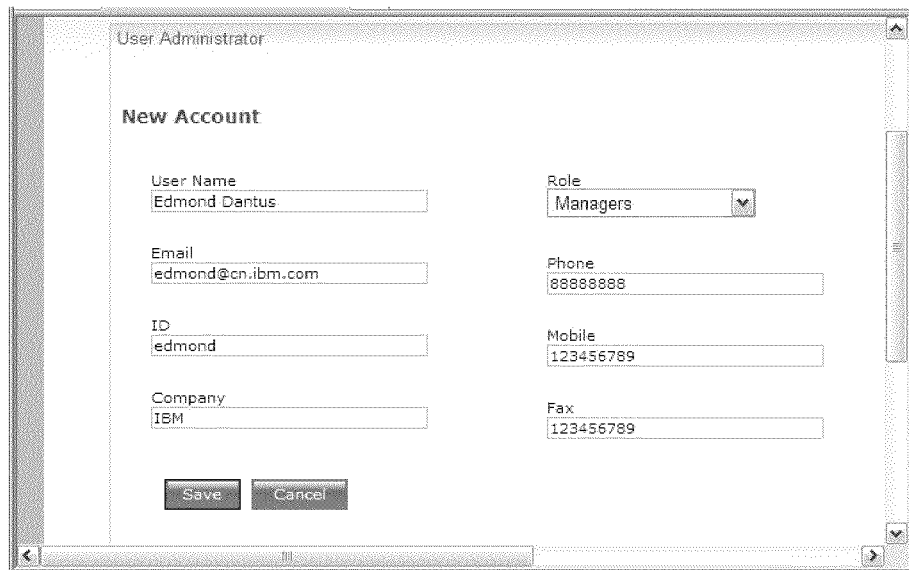
FIGS. 3A-3D illustrate a specific example of generating a Web service based on a function of a Web application according to embodiments of the present invention. Specifically.

FIG. 3A illustrates a user input information interface for the function "Create New Users" of a Web application. In this figure, there are a total of eight input fields, i.e., eight parameters. A user has inputted eight corresponding input values into the eight input fields. After the user inputs the eight input values, the eight input values are obtained. After the user completes the input and clicks on a button "Save," call stack information for the function "Create New Users" is obtained, as illustrated in FIG. 3B.

Figure 3B:
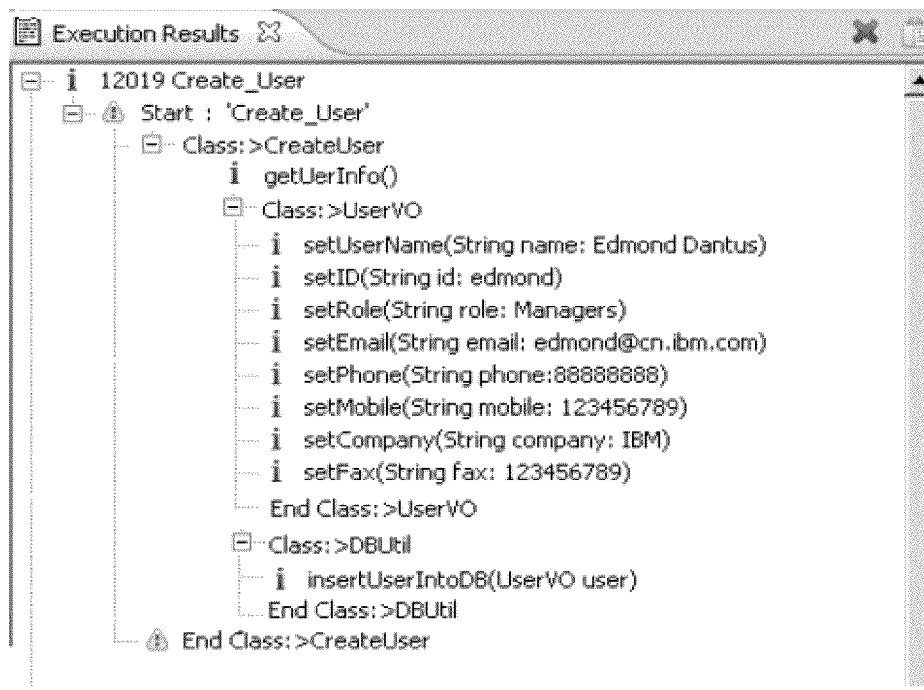

FIG. 3B illustrates the call stack information for the function "Create New Users" based on the user's 8 input values. It can be seen from FIG. 3B that the call stack information comprises multiple classes, such as CreateUser, UserVO, DBUtil, etc. Under each class there exist some methods. For example, under class Createtser there exists a method named getUserinfo( ) that is marked by "i" in the call stack information in this example.

Figures 3C, 3D:
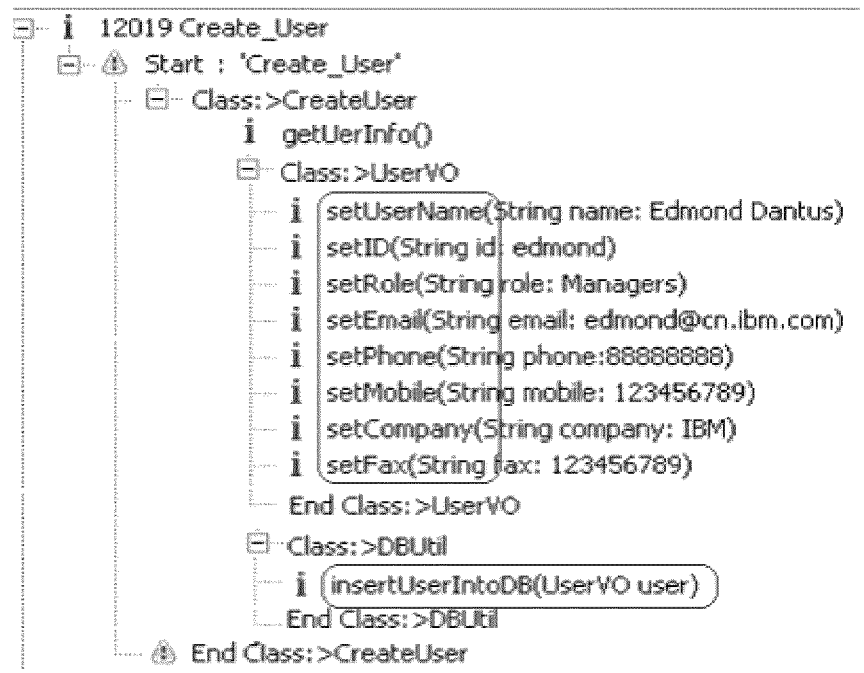

Next, the parameter matching is performed between the obtained user input information (the eight input values) and the call stack information illustrated in FIG. 3B by using the method according to an embodiment of the present invention. The procedure of parameter matching is generally illustrated in FIG. 3C. As illustrated in FIG. 3C, the obtained eight user input values are equal to parameter values (which are contents placed in parentheses of respective methods) for eight methods under class UserVO, respectively. Therefore, it is determined that the eight input fields (parameters) corresponding to the eight user input values match the eight methods, respectively.

Next, a method is selected from the call stack information as an API based on the result of the parameter matching and the call stack information. According to an embodiment of the present invention, a method that covers all parameters is selected as an API. As illustrated in FIG. 3C, the parameter of method insertUserintoDB (UserVO user) under class DRUtil comprises class UserVO, and the matching eight methods are methods under class UserVO, so method inserfUserintoDB (UserVO user) is the method covering all parameters. Finally, method insertUserIntoDB is selected as an API.

FIG. 3D illustrates a result of using the selected method as an API of a function of the Web application "Create New User" to generate a Web service corresponding to the function by using the API. The generated Web service may be called by developers of other application programs, thereby achieving reuse of the Web application "Create New Users."

The example of FIGS. 3A-3D illustrates that by using embodiments of the present invention, it is possible to automatically identify a suitable API by a tactful use of the call stack information, thereby avoiding tremendous labor and efforts of manually reading source code to seek an API for a Web application or a function of a Web application. Time for generating a Web service is thus saved, and efficiency improved. The efficiency of generating a Web service based on a "legacy system" is improved, thereby saving the cost for developing a new system. Further, there is no need to obtain the source code of the "legacy system" (Web application) during the process of Web service generation.

Figure 4:
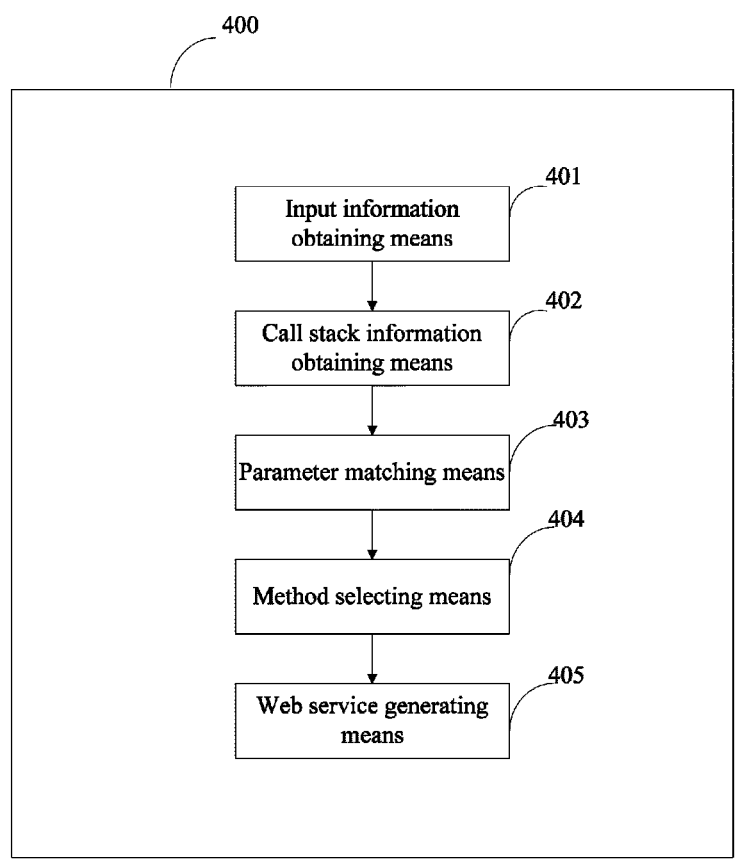
FIG. 4 illustrates a block diagram of a system for generating a Web service according to an embodiment of the present invention.

FIG. 4 illustrates a block diagram of a system of generating a Web service based on a Web application according to an embodiment of the present invention. The system illustrated in FIG. 4 is generally denoted as a system 400. Specifically, the system 400 comprises input information obtaining means 401 for obtaining user input information of the Web application, call stack information obtaining means 402 for obtaining call stack information that is generated by the Web application at runtime based on the user input information, parameter matching means 403 for performing parameter matching between the user input information and the call stack information, method selecting means 404 for selecting a method from the call stack information as an application programming interface API based on a result of the parameter matching and the call stack information, and Web service generating means 405 for generating a Web service by using the application programming interface API. The system 400 generally corresponds to the method illustrated in FIG. 1, and the means 401-405 of the system 400 may be understood as corresponding to the flows 101-105 of the method illustrated in FIG. 1, respectively.

Further, the parameter matching means 403 of the system 400 may be further configured to perform the flows 203-208 of the method illustrated in FIG. 2, and the method selecting means 404 may be further configured to perform the flows 209-212 of the method illustrated in FIG. 2.

From the foregoing description of specific embodiments, the foregoing system, apparatus and method may be implemented with computer executable instructions and/or in processor control code. For example, such code is provided on a carrier storage medium such as a magnetic disk, CD or DVD-ROM, a programmable memory such as a read-only memory (firmware), or a data carrier such as an optical or electronic storage medium. The apparatus, server and their units in the present embodiment may be implemented by hardware circuitry of a programmable hardware apparatus such as a very large scale integrated circuit or gate array, a semiconductor such as logical chip or transistor, or a field-programmable gate array, or a programmable logical apparatus, or implemented by software executed by various kinds of processors, or implemented by combination of the above hardware circuitry and software.

Although the system and method of generating a Web service based on a Web application have been described in detail with reference to the preferred embodiments, the present invention is not limited to this. Those of ordinary skill in the art can make various changes, alterations and modifications to the present invention under the teaching of the description without departing from the spirit and scope of the present invention. It should be understood that all such changes, alterations, and modifications still fall into the protection scope of the present invention. The protection scope of the present invention is defined by the appending claims.

What is claimed is:

1. A method of generating a Web service based on an existing Web application, the method comprising:
    obtaining user input information that includes at least one input value entered by a user that interacts with the Web application;
    obtaining call stack information that is generated by the Web application at runtime based on the user input information;
    performing parameter matching between the user input information and the call stack information by determining whether there is a parameter value in the call stack information that matches a selected input value from the obtained user input information;
    selecting a method from the call stack information based on a result of the parameter matching and the call stack information by identifying methods in the call stack information that include at least one of the parameters with a value that matches at least one of the input values and selecting a method from the identified methods; and
    treating the selected method from the call stack information as an exposed application programming interface to generate a Web service.

2. The method according to claim 1, wherein performing parameter matching between the user input information and the call stack information by determining whether there is a parameter value in the call stack information that matches a selected input value from the obtained user input information further comprises:
    determining that the selected input value is equal to the parameter value in the call stack information.

3. The method according to claim 1, wherein performing parameter matching between the user input information and the call stack information by determining whether there is a parameter value in the call stack information that matches a selected input value from the obtained user input information further comprises:
    determining, based on a predetermined similarity threshold, whether the selected input value matches the parameter value of the method in the call stack information if the input value is not equal to the parameter value.

4. The method according to claim 1, wherein selecting a method from the call stack information as the application programming interface comprises:
    selecting a method that covers all parameters of the user input information as the application programming interface from the call stack information, based on the result of the parameter matching.

5. The method according to claim 4, wherein selecting a method that covers all parameters of the user input information as the application programming interface from the call stack information, is performed based on at least one of the following criteria if the call stack information includes a plurality of methods, each of which covers all parameters of the user input information:
    selecting, from the plurality of methods each of which covers all parameters of the user input information, a method that is located at a bottom layer of the call stack information;
    selecting, from the plurality of methods each of which covers all parameters of the user input information, a method that is located at a top layer of the call stack information; and
    providing the plurality of methods each of which covers all parameters in the user input information as candidate methods.

6. The method according to claim 1, wherein selecting a method from the call stack information as the application programming interface is performed based on at least one of the following criteria if the call stack information includes no method that covers all parameters of the user input information:
    selecting, from the call stack information, a method having the highest coverage ratio as the application programming interface; and
    ranking all methods, each of which partially covers parameters in the user input information, based on coverage ratios in a high-to-low order, as candidate methods.

7. The method according to claim 1, wherein the obtained user input information of the Web application refers to user input information for a particular function of the Web application.

8. The method of claim 1, wherein performing parameter matching further includes parameter type matching.

9. A system for generating a Web service based on an existing Web application, comprising:
a microprocessor coupled to a memory, wherein the microprocessor is programmed to generate Web services by:
obtaining user input information that includes at least one input value entered by a user that interacts with the Web application;
obtaining call stack information that is generated by the Web application at runtime based on the user input information;
performing parameter matching between the user input information and the call stack information by determining whether there is a parameter value in the call stack information that matches a selected input value from the obtained user input information;
selecting a method from the call stack information based on a result of the parameter matching and the call stack information by identifying methods in the call stack information that include at least one of the parameters with a value that matches at least one of the input values and selecting a method from the identified methods; and
treating the selected method from the call stack information as an exposed application programming interface to generate a Web service.

10. The system according to claim 9, wherein the processor is further programmed for performing parameter matching between the user input information and the call stack information by determining whether there is a parameter value in the call stack information that matches a selected input value from the obtained user input information, by:
determining that the selected input value is equal to the parameter value in the call stack information.

11. The system according to claim 9, wherein the processor is further programmed for performing parameter matching between the user input information and the call stack information by determining whether there is a parameter value in the call stack information that matches a selected input value from the obtained user input information, by:
determining, based on a predetermined similarity threshold, whether the selected input value matches the parameter value of the method in the call stack information if the input value is not equal to the parameter value.

12. The system according to claim 9, wherein the processor is programmed for selecting a method from the call stack information as the application programming interface by:
selecting a method that covers all parameters of the user input information as the application programming interface from the call stack information, based on the result of the parameter matching.

13. The system according to claim 12, wherein the processor is programmed for selecting a method that covers all parameters of the user input information as the application programming interface from the call stack information by:
selecting a method that covers all parameters of the user input information as the application programming interface from the call stack information, if the call stack information includes a plurality of methods each of which covers all parameters of the user input information, based on at least one of the following criteria:
selecting, from the plurality of methods each of which covers all parameters of the user input information, a method that is located at a bottom layer of the call stack information;
selecting, from the plurality of methods each of which covers all parameters of the user input information, a method that is located at a top layer of the call stack information; and
providing the plurality of multiple methods each of which covers all parameters in the user input information, as candidate methods.

14. The system according to claim 9, wherein the processor is programmed for selecting a method from the call stack information as the application programming interface by:
selecting a method from the call stack information as the application programming interface, if the call stack information includes no method that covers all parameters of the user input information, based on at least one of the following criteria:
selecting, from the call stack information, a method having the highest coverage ratio as the application programming interface; and
ranking all methods, each of which partially covers parameters in the user input information, based on coverage ratios in a high-to-low order as candidate methods.

15. The system according to claim 9, wherein the obtained user input information of the Web application refers to user input information for a particular function of the Web application.

16. The system according to claim 9, wherein performing parameter matching further includes parameter type matching.

17. A non-transitory computer-readable storage medium with an executable program stored thereon, wherein the program instructs a microprocessor to generate a Web service by:
obtaining user input information that includes at least one input value entered by a user that interacts with the Web application; obtaining call stack information that is generated by the Web application at runtime based on the user input information;
performing parameter matching between the user input information and the call stack information by determining whether there is a parameter value in the call stack information that matches a selected input value from the obtained user input information;
selecting a method from the call stack information based on a result of the parameter matching and the call stack information by identifying methods in the call stack information that include at least one of the parameters with a value that matches at least one of the input values and selecting a method from the identified methods;
and treating the selected method from the call stack information as an exposed application programming interface to generate a Web service.

18. The computer-readable storage medium according to claim 17, wherein performing parameter matching between the user input information and the call stack information by determining whether there is a parameter value in the call stack information that matches a selected input value from the obtained user input information further comprises:
determining that the selected input value is equal to the parameter value in the call stack information.

19. The computer-readable storage medium according to claim 17, wherein performing parameter matching between the user input information and the call stack information by determining whether there is a parameter value in the call stack information that matches a selected input value from the obtained user input information further comprises:

determining, based on a predetermined similarity threshold, whether the selected input value matches the parameter value of the method in the call stack information if the input value is not equal to the parameter value.

20. The computer-readable storage medium according to claim 17, wherein selecting a method from the call stack information as the application programming interface comprises:

selecting a method that covers all parameters of the user input information as the application programming interface from the call stack information, based on the result of the parameter matching.

21. The computer-readable storage medium according to claim 20, wherein selecting a method that covers all parameters of the user input information as the application programming interface from the call stack information, is performed based on at least one of the following criteria if the call stack information includes a plurality of methods, each of which covers all parameters of the user input information:

selecting, from the plurality of methods each of which covers all parameters of the user input information, a method that is located at a bottom layer of the call stack information;

selecting, from the plurality of methods each of which covers all parameters of the user input information, a method that is located at a top layer of the call stack information; and providing the plurality of methods each of which covers all parameters in the user input information as candidate methods.

22. The computer-readable storage medium according to claim 17, wherein selecting a method from the call stack information as the application programming interface is performed based on at least one of the following criteria if the call stack information includes no method that covers all parameters of the user input information:

selecting, from the call stack information, a method having the highest coverage ratio as the application programming interface; and ranking all methods, each of which partially covers parameters in the user input information, based on coverage ratios in a high-to-low order, as candidate methods.

23. The computer-readable storage medium according to claim 17, wherein the obtained user input information of the Web application refers to user input information for a particular function of the Web application.

24. The computer-readable storage medium according to claim 17, wherein performing parameter matching further includes parameter type matching.

* * * * *